Figure 1:
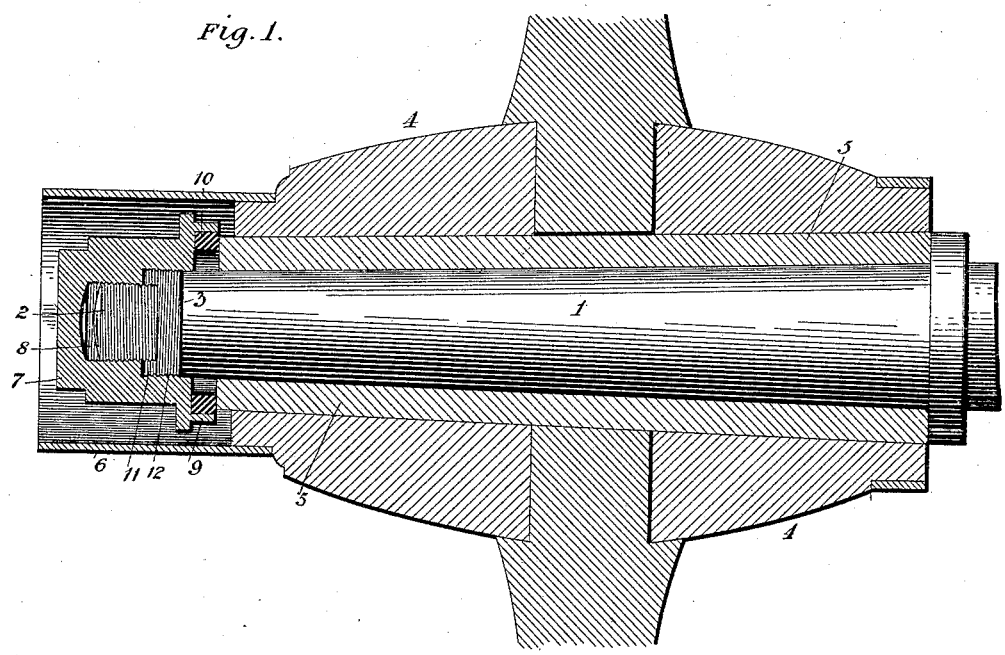

(No Model.)

T. A. WHEELER.
CARRIAGE AXLE NUT.

No. 430,598. Patented June 17, 1890.

WITNESSES:

INVENTOR
Theodore A. Wheeler
BY
Johnson & Johnson
his ATTORNEYS.

UNITED STATES PATENT OFFICE.

THEODORE A. WHEELER, OF SAN JOSÉ, CALIFORNIA, ASSIGNOR OF ONE-HALF TO W. F. WRIGHT, OF SAME PLACE.

CARRIAGE-AXLE NUT.

SPECIFICATION forming part of Letters Patent No. 430,598, dated June 17, 1890.

Application filed November 20, 1889. Serial No. 331,016. (No model.)

*To all whom it may concern:*

Be it known that I, THEODORE A. WHEELER, a citizen of the United States, residing at San José, in the county of Santa Clara and State of California, have invented new and useful Improvements in Carriage-Axle Nuts, of which the following is a specification.

I have improved the construction of the carriage-axle nut which secures the hub on the carriage-axle spindle, so as to compensate for the wear of the washers at the inner and outer ends of the axle-spindle and to relieve such washers of undue binding and wear. Various constructions have been provided for effecting this object, and among which is the provision of a check-nut engaging the interior screw of the axle-nut, so as to form an adjustable bearing against the outer screw-threaded end of the axle-spindle; but in this construction there is no provision for preventing the nut from turning when set, and it is liable, therefore, to fail to effect a bearing upon the end of the axle-spindle. To avoid this objection, such check-nut has been made in the form of a headed screw having its screw-shank inserted in a threaded socket in the screw-threaded end of the axle-spindle and having its head bearing against a flange in the outer open end of the axle-nut, the thread of said headed screw having an opposite pitch to that of the box and the axle-spindle, so that the turning of the nut upon the head of the inserted screw will not turn the latter. It is an objection in both of these plans that the axle-nut must be made longer than the ordinary axle-nut to provide for the thickness and for the adjustment of the check-nut in the space between the end of the axle-spindle and the end of the hub-attaching nut. While my improvement provides an adjustable bearing for the axle-spindle within the axle-nut, yet such provision is made with special reference to avoiding the objections of increasing the length of the box, or of placing such adjustable bearing within the outer end of the box, or of placing such adjustable bearing upon the outer side of the box.

My improvement is easily applied to an ordinary axle-nut, and is so applied within its open flanged end as to provide an interior adjustable bearing in the nut against the shoulder of the axle-spindle, as I will now describe, and at the conclusion of such description I will specifically point out the features claimed as my improvement.

The objects are attained in the device illustrated in the accompanying drawings, forming part of this specification, in which the same reference-numerals indicate the same parts, and in which—

Figure 2:
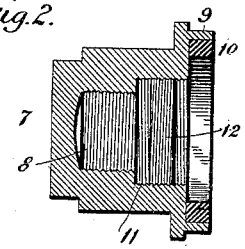
Figure 3:
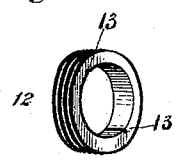

Figure 1 represents a longitudinal section of an axle spindle and wheel-hub provided with my improvement; Fig. 2, a longitudinal section of the nut, and Fig. 3 a perspective view of the adjustable washer or collar in the same.

In the drawings, the numeral 1 indicates the axle-spindle, which is formed with a reduced screw-threaded outer end 2 and a shoulder 3 at said end. The hub 4, having the box 5 and the sand-band 6, is journaled upon said spindle in the usual manner, and is secured against longitudinal displacement upon the axle-nut 7, which is screwed upon the screw-threaded end 2 of the spindle with its female screw-threaded bore 8, and has a flange 9 at its inner end, which fits inside the sand band of the hub and confines a yielding washer 10, which bears against the box of the hub and excludes dust and dirt from entering between the spindle and box.

All the hereinbefore-described parts are of the construction usually found in vehicle-axles, hubs, and nuts, with the exception that the nut is formed with an enlargement 11 in the inner end of its bore. Said enlargement 11 is screw-threaded in a direction opposite to the thread of the bore 8, and a washer or collar 12, having an external screw-thread, is screwed into said enlargement. The inner side or edge of said collar or washer is preferably formed with nicks or notches 13 for fitting a tool into and screwing the collar or washer in or out. Said collar or washer bears against the shoulder of the spindle and limits the extent to which the nut may be screwed upon the screw-threaded end of the spindle, and thus regulates the degree of pressure of the yielding washer against the box of the hub.

When the yielding washer in the nut is new and not worn and the box of the hub fits perfectly upon the spindle, the collar or washer is screwed out in the enlargement of the bore in the nut, so that said washer will just bear against the box and hold the hub upon the spindle; but as the box and spindle wear out and the yielding washer becomes worn or compressed it becomes necessary to take up the endwise play of the hub upon the spindle, for which purpose the nut will have to be screwed farther in upon the spindle and against the box. To admit of this, the collar or washer is screwed farther into the enlargement of the bore in the nut, and said collar or washer may be so adjusted that the yielding washer will just bear against the box without binding against the same.

By having the collar or washer inside of the nut and only accessible from the inner end of the nut when the latter is removed from the spindle said collar or washer cannot be in any way affected by dirt or dust or be injured or tampered with, which is liable to happen with adjustable collars or sleeves upon the outside of the nut or with adjustable stops accessible from the outside.

By having the screw-threads in the enlargement of the bore in the nut made in opposite direction to the screw-thread of said bore the adjustable collar or washer will not be displaced by screwing the nut upon the spindle, or, at all events, will not be screwed into the nut, so that the adjustment of the yielding washer against the end of the box may be made positive and certain.

A common axle-nut may be bored out to have the enlargement and a collar or washer put into said enlargement, so that my improvement may be applied to vehicles already in use without any great change and addition of parts involving consequent cost.

Having thus fully described the construction and arrangement or combination of the several parts of my improved axle-nut, its operation, and advantages, what I claim as new is—

1. The herein-described carriage-axle nut having interior screw-threaded bores of different diameters, the bore 11 of greatest diameter terminating at the open flanged end of said nut and having its screw on an opposite pitch to the screw of the closed-end bore 8 of least diameter, in combination with an externally-screw-threaded ring or collar engaging the screw-threads of greatest diameter, an axle-spindle having its screw end engaging the nut-screw of least diameter and passing through said ring or collar, an axle-box, and a bearing-washer at each end of said axle-box, substantially as described.

2. In a hub-attaching device, the axle-nut having the interior screw-threaded bores 11 and 8 of unequal diameters, the bore of greatest diameter having a left screw-thread and terminating at the inner open end, and having the annular flange 9 at said end, in combination with the ring or collar bearing 12, having an external screw engaging the left screw of the nut, the axle-spindle having its screw end passing through said ring-bearing, the axle-box, and the washers at each end of the latter, as described.

In testimony whereof I have hereunto set my hand in the presence of two subscribing witnesses.

THEODORE A. WHEELER.

Witnesses:
W. F. WRIGHT,
J. A. REA.